R. H. HILL.
Safety-Elevator.

No. 219,262. Patented Sept. 2, 1879.

WITNESSES:
Chas. Nida
C. Sedgwick

INVENTOR:
R. H. Hill
BY Munn &c
ATTORNEYS.

UNITED STATES PATENT OFFICE.

RICHARD H. HILL, OF NEW HAVEN, CONNECTICUT.

IMPROVEMENT IN SAFETY-ELEVATORS.

Specification forming part of Letters Patent No. 219,262, dated September 2, 1879; application filed July 7, 1879.

*To all whom it may concern:*

Be it known that I, RICHARD H. HILL, of New Haven, in the county of New Haven and State of Connecticut, have invented a new and useful Improvement in Safety-Elevators, of which the following is a specification.

Figure 1:
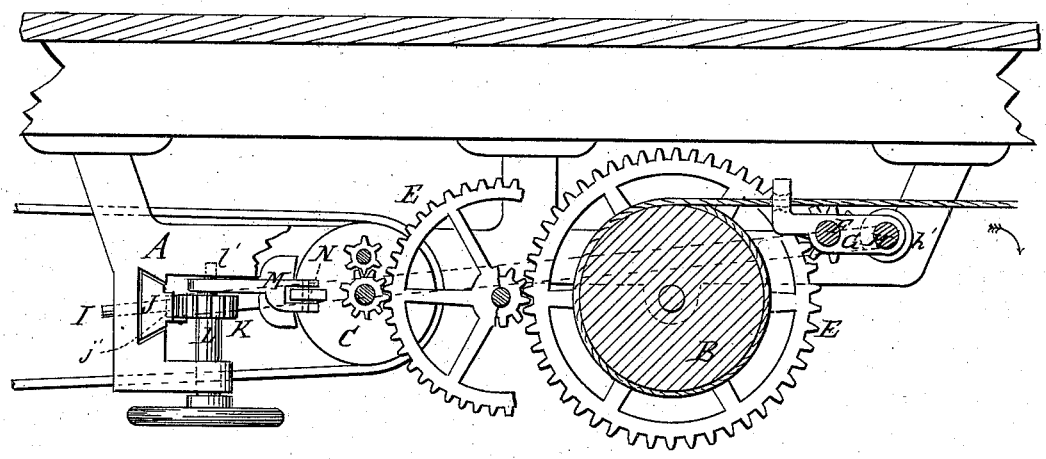
Figure 2:
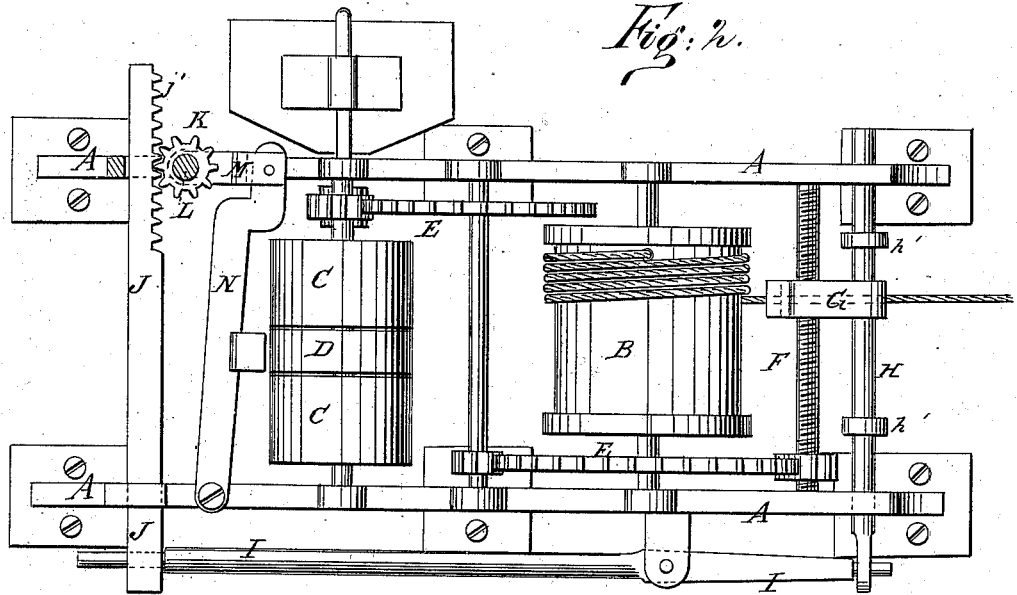
Figure 3:
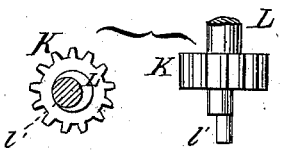

Figure 1 is a side view, partly in section, to show the construction of the operating mechanism of an elevator to which my improvement has been applied. Fig. 2 is a bottom view of the same, part being broken away to show the construction. Fig. 3 are detail views of the gear-wheel and eccentric for operating the brake.

Similar letters of reference indicate corresponding parts.

The object of this invention is to furnish elevators which shall be so constructed that the motion of the operating mechanism may be reversed automatically as the platform reaches the upper and lower points of its movement, and which will apply a brake automatically when shifting the driving-belts, so that the platform cannot run down accidentally, and which shall be simple in construction and reliable in use.

The invention consists in the swiveled screw provided with the nut, the sliding bar provided with the two collars, and the lever with the shipper-bar and with the operating-gearing of the elevator, and in the combination of the gear-wheel, the shaft, the eccentric, and the sliding bar with the shipper-bar provided with gear-teeth and with the brake-bar, as hereinafter fully described.

A represents the frame, with which the various parts of the operating mechanism are connected, and which is designed to be attached to the frame-work of the building, or to other suitable supporting frame-work. B is the drum to which the hoisting-rope is attached, and the shaft of which revolves in bearings attached to the frame A. C are the two loose pulleys, and D is the fast pulley, that receive the straight belt and the crossed belt for raising and lowering the platform.

The pulleys C D C are placed upon a shaft which revolves in bearings attached to the frame A. The shaft of the pulleys C D C and the shaft of the drum B are connected by gear-wheels E, so that the said drum B may be turned in one or the other direction, according as the straight or the crossed driving-belt may be upon the fast pulley D.

The gear-wheel E on the shaft of the drum gears with a pinion on the screw F, which is swiveled to the frame A, and has a nut, G, placed upon it, so that the said nut may be carried back and forth along the said screw as it is turned in one and the other direction by the gearing E. Upon the inner end of the nut G is formed an eye to receive the hoisting-rope to lay the said rope evenly upon the said drum B. In the outer end of the nut G is formed a hole to receive a rod, H, which slides longitudinally in bearings attached to the frame A, and has collars h′ attached to it upon the opposite sides of the nut G, so that the said rod H may be slid back and forth by the nut G coming in contact with the said collars alternately.

The collars h′ should be secured adjustably to the rod H by set-screws or other suitable means, so that they may be adjusted farther apart or closer together, as the height of the elevator may require. With one end of the sliding rod H is connected the end of a lever, I, which is pivoted to the frame A, and its other end is connected with the end of the shipper-bar J. The shipper-bar J slides in bearings attached to the frame A, so that the belt may be shifted automatically upon the pulleys C D C, to reverse the motion as the platform completes its movement in either direction.

The forked arms that connect the shipper-bar J with the belts are not shown in the drawings, as there is nothing new in their construction.

Upon one side of the shipper-bar J are formed gear-teeth J′, which mesh into the teeth of a small gear-wheel, K, attached to a shaft, L. The shaft L works in bearings attached to the frame A, and has a hand-wheel or other device connected with it, so that the belts may be shifted by hand when desired.

Upon the shaft L is formed an eccentric, l′, which works in a hole in the outer end of the sliding bar M. The bar M slides upon the side bar of the frame A, and to its outer end is pivoted the end of the brake-bar N, the other end of which is pivoted to the other side bar of the said frame A. With the brake-bar N is designed to be connected a brake-shoe to bear against the fast pulley D, or a brake-strap to pass around a friction-pulley attached to the shaft of the pulleys C D C.

The brake-shoe or the brake-strap and pulley are not shown in the drawings, as there is nothing new in their construction.

The connecting-bar M may be made in two parts connected together by a right-and-left nut or a right-and-left screw, so that the said bar may be readily lengthened to take up the wear. With this construction the brake will be applied automatically as the driving-belts are being shifted, so that the platform cannot run down while the belts are passing from and to the fast pulley D.

Having thus described my invention, I claim as new and desire to secure by Letters Patent—

1. The combination of the swiveled screw F, provided with the nut G, the sliding rod H, provided with the collars $h'$, and the lever I, with the shipper-bar J and with the operating-gearing of the elevator, substantially as herein shown and described.

2. The combination of the gear-wheel K, the shaft L, the eccentric $l'$, and the sliding bar M with the shipper-bar J, provided with gear-teeth $j'$, and the brake-bar N, substantially as herein shown and described.

RICHARD H. HILL.

Witnesses:
P. P. JOHNSON,
A. J. MAGNA.